United States Patent
Kulawiec et al.

(10) Patent No.: US 7,268,887 B2
(45) Date of Patent: Sep. 11, 2007

(54) OVERLAPPING COMMON-PATH INTERFEROMETERS FOR TWO-SIDED MEASUREMENT

(75) Inventors: Andrew W. Kulawiec, Fairport, NY (US); Mark J. Tronolone, Fairport, NY (US); Thomas J. Dunn, Penfield, NY (US); Joseph C. Marron, Pittsford, NY (US)

(73) Assignee: Corning Incorporated, Corning, NY (US)

( * ) Notice: Subject to any disclaimer, the term of this patent is extended or adjusted under 35 U.S.C. 154(b) by 193 days.

(21) Appl. No.: 11/023,018

(22) Filed: Dec. 23, 2004

(65) Prior Publication Data

US 2006/0139656 A1    Jun. 29, 2006

(51) Int. Cl.
*G01B 11/02*    (2006.01)

(52) U.S. Cl. .................... 356/496; 356/485; 356/492

(58) Field of Classification Search ............... 356/489, 356/495, 511–515, 485, 496, 492
See application file for complete search history.

(56) References Cited

U.S. PATENT DOCUMENTS

| 5,995,226 A  | * | 11/1999 | Abe et al. .................... 356/511 |
| 6,504,615 B1 | * | 1/2003  | Abe et al. .................... 356/511 |
| 6,847,458 B2 | * | 1/2005  | Freischlad et al. ........... 356/511 |
| 6,882,432 B2 |   | 4/2005  | Deck ........................... 356/512 |
| 6,924,898 B2 |   | 8/2005  | Deck ........................... 356/512 |
| 6,977,730 B2 | * | 12/2005 | Evans .......................... 356/511 |
| 2001/0043333 A1 | * | 11/2001 | Groot et al. ................. 356/511 |
| 2004/0184038 A1 | * | 9/2004  | Freischlad et al. ........... 356/512 |
| 2005/0041257 A1 | * | 2/2005  | Evans .......................... 356/512 |

\* cited by examiner

*Primary Examiner*—Gregory J. Toatley, Jr.
*Assistant Examiner*—Patrick J. Connolly
(74) *Attorney, Agent, or Firm*—Timothy M. Schaeberle

(57) ABSTRACT

Two common-path interferometers share a measuring cavity for measuring opposite sides of opaque test parts. Interference patterns are formed between one side of the test parts and the reference surface of a first of the two interferometers, between the other side of the test parts and the reference surface of a second of the two interferometers, and between the first and second reference surfaces. The latter measurement between the reference surfaces of the two interferometers enables the measurements of the opposite sides of the test parts to be related to each other.

33 Claims, 9 Drawing Sheets

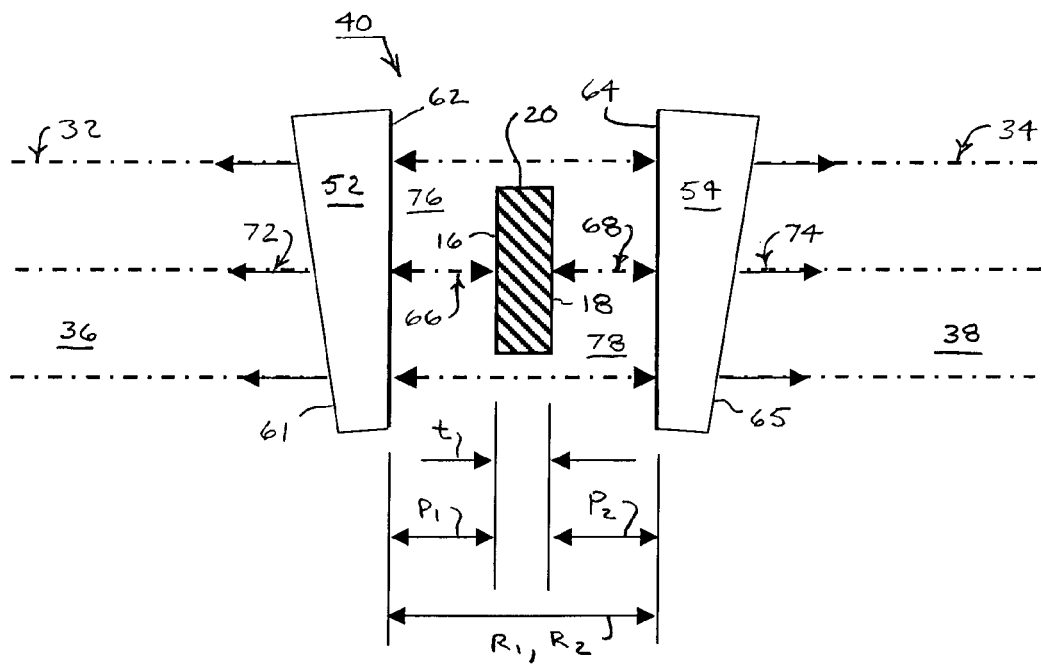
Fig. 2
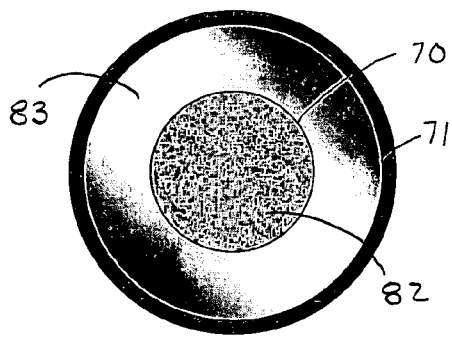 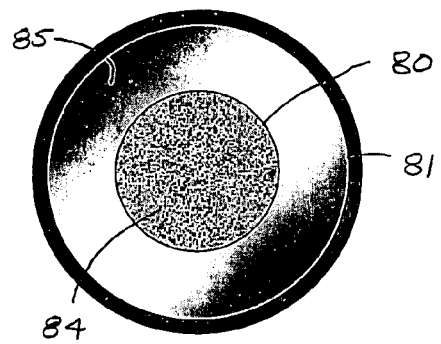
Fig. 3A            Fig. 3B

OVERLAPPING COMMON-PATH INTERFEROMETERS FOR TWO-SIDED MEASUREMENT

TECHNICAL FIELD

Two-sided measurement of opaque parts, including part assemblies, by interferometers involves separately measuring the two sides and relating the separate measurements to each other for making comparisons between the two sides. Part parameter comparisons include three-dimensional form, profile, flatness, parallelism, and thickness.

BACKGROUND OF THE INVENTION

The measurement of opposite side surfaces of opaque parts is difficult to accomplish using conventional interferometry, particularly for purposes of both measuring the two sides individually, such as for determining flatness of each, and measuring the two sides relative to each other, such as for determining parallelism and thickness. For example, separate interferometers can be used to measure the two sides individually for determining flatness, but each is a relative measure unrelated to the other. Interferometers including combinations of mirrors have been used to measure the two sides simultaneously for determining thickness variations, but the combined measure does not distinguish differences between the sides.

The opposite sides of gage blocks and other flats have been separately measured with respect to a common mounting surface, but the results are dependent upon vagaries of the mountings. For example, a first side of the gage blocks is mounted on a flat mounting surface, and the second side of the gage blocks together with the reference surface is imaged by a multiple wavelength interferometer that measures not only variations in the second side of the gage block but also differences between the second side of the gage block and the flat mounting surface. The method assumes that the first side of the gage block is adequately represented by the reference surface on which it is mounted for purposes of measuring thickness and parallelism. However, surface irregularities, whose determination are among the actual purposes of the measurement, and foreign contaminants can distort the comparative measurements.

Another known approach arranges two long-wavelength interferometers (i.e., infrared interferometers) for simultaneously measuring the opposite side surfaces of opaque parts. For purposes of calibration, a semitransparent optical flat is located within the field of view of the two interferometers when the parts are removed and is used to define a common datum surface against which the measurements of both interferometers are referenced. Another interferometer operating in the visible range measures optical path length variations that occur subsequent to the calibration with the optical flat. Each interferometer has its own reference surface, and the calibration of the two reference surfaces with the optical flat over measurements taken at different times and under different conditions adds considerable complexity and opportunity for error.

SUMMARY OF THE INVENTION

The invention in one or more of its preferred embodiments combines two common-path interferometers for measuring the opposite sides of opaque test parts, including part assemblies. At least one of the common-path interferometers is a frequency-shifting or other long-range interferometer for measuring reference surfaces of the two interferometers with respect to each other. The two common-path interferometers are arranged end to end so that their respective reference surfaces form a measuring cavity straddling the opaque test parts. One interferometer measures distances between corresponding points on a first side of the opaque test parts and its reference surface. The other interferometer measures distances between corresponding points on a second side of opaque test parts and its reference surface. At least one of the two overlapping interferometers, e.g., the frequency-shifting interferometer, also measures distances between corresponding points on the two reference surfaces. Distances between points on opposite sides of the opaque test parts can be calculated from the relative measures of their two sides and the two reference surfaces. Each side of the opaque test parts can be individually defined and spatially related to their other side for constructing a three-dimensional representation of the opaque test parts.

As such, the invention extends the precision of optical interferometry beyond the ordinary field of view of a single interferometer for achieving three-dimensional representations of opaque test parts. The opposite sides of the test parts having opaque surfaces can be individually measured to the customary precision of conventional phase-shifting interferometers and can be related to each other with similar precision for making comparative measurements. The measurement of the reference surfaces preferably takes place simultaneously with the two measurements of the opposite side surfaces of the opaque test parts to avoid time-sensitive calibration errors. As a result, the measurements can be taken in production environments or other non-laboratory environments and can accommodate a range of positioning and alignment errors, because the measurements of the reference surfaces provide automatic self-calibration for the overlapping interferometers. Any changes to the spacing or orientation of the reference surfaces can be measured simultaneously with the measurements of the opposite side surfaces.

The two reference surfaces can be calibrated with respect to each other through a single additional measurement, whereas multiple additional measurements would be required for calibrating the two reference surfaces with respect to an independent datum. However, both interferometers could be used for taking the same measurement between their reference surfaces for further calibrating the results of the two interferometers with respect to each other.

One version of the invention as an interferometric system for measuring opposite side surfaces of opaque parts both individually and with respect to each other includes first and second interferometers having respective first and second reference surfaces that are located within a field of view of at least one of the interferometers. The first interferometer is positioned for measuring distances between corresponding points on a first side of the opaque parts and the first reference surface. The second interferometer is positioned for measuring distances between corresponding points on a second side of the opaque parts and the second reference surface. In addition, the first interferometer is positioned for measuring distances between corresponding points on the first and second reference surfaces. A processor relates the relative measurements of the first and second sides of the opaque parts with respect to each other based on the relative measurement of the reference surfaces.

Preferably, a mount is provided for positioning the opaque parts between the first and second reference surfaces such that the first side of the opaque part is adjacent to the first reference surface and the second side of the opaque part is adjacent to the second reference surface. The two reference surfaces are preferably both partially transmissive and partially reflective. The first interferometer preferably has a first reference path that includes reflections from the first reference surface and a first test path that includes transmissions to and from the first side of the opaque parts through the first reference surface, and the second interferometer preferably has a second reference path that includes reflections from the second reference surface and a second test path that includes transmissions to and from the second side of the opaque parts through the second reference surface. The first interferometer also preferably has a test path that includes transmissions to and from the second reference surface through the first reference surface.

For measuring over a greater range, the first interferometer is preferably a frequency-shifting interferometer that operates at a succession of different measuring beam frequencies for resolving wavelength-based measurement ambiguities over distances between the first and second reference surfaces.

Another version of the invention as an interferometric system for measuring test parts having first and second side surfaces also includes first and second interferometers. The first interferometer includes a first reference surface and a first optical pathway that conveys a first measuring beam for measuring optical path length differences between the first side surface of the test parts and the first reference surface. The second interferometer includes a second reference surface and a second optical pathway that conveys a second measuring beam for measuring optical path length differences between the second side surface of the test parts and the second reference surface. The first optical pathway of the first interferometer extends beyond the first side surface of the test parts to the second reference surface of the second interferometer for measuring optical path length differences between the first and second reference surfaces. A processor combines the measures of the respective optical path length differences between the first and second side surfaces of the test parts and the first and second reference surfaces with the measures of the optical path length differences between the first and second reference surfaces for measuring distances between the first and second side surfaces of the test parts.

The first optical pathway preferably overlaps the second optical pathway in length between the second side surface of the test parts and the second reference surface. The first reference surface preferably divides the first measuring beam into a first reference beam that reflects from the first reference surface and a first test beam that transmits through the first reference surface. The first test beam preferably includes a primary transverse area that reflects from the first side surface of the test parts and a secondary transverse area that reflects from the second reference surface. The primary and secondary transverse areas of the first test beam preferably encounter the first side surface of the test parts and the second reference surface at near normal incidence.

The processor preferably derives (a) a first measure of parallelism between the first side surface of the test parts and the first reference surface, (b) a second measure of parallelism between the second side surface of the test parts and the second reference surface, and (c) a third measure of parallelism between the two reference surfaces and combines the three measures of parallelism to calculate a fourth measure of parallelism between the first and second side surfaces of the test parts.

The first and second reference surfaces preferably straddle a mount for the test parts along the first optical pathway and extend substantially parallel to one another. The second optical pathway of the second interferometer can extend beyond the second side surface of the test parts to the first reference surface of the first interferometer for measuring optical path length differences between the first and second reference surfaces. As such, the second optical pathway overlaps the first optical pathway in length between the first side surface of the test parts and the first reference surface. The processor compares the measure of optical path length differences between the first and second reference surfaces by the first interferometer with the measure of optical path length differences between the first and second reference surfaces by the second interferometer for measuring differences between the first and second interferometers.

Another version of the invention as an interferometric system for measuring the opposite sides of a test part both individually and relative to each other includes first and second interferometers arranged for measuring the opposite sides of the test part. The interferometers have at least one light source for producing first and second measuring beams and an imaging subsystem for imaging the opposite sides of the test part with the first and second measuring beams. The first interferometer has a first reference surface that divides the first measuring beam into a first reference beam and a first test beam for measuring optical path length differences between the first reference surface and a first of the opposite sides of the test part and between the first reference surface and the second reference surface of the second interferometer. The second interferometer has a second reference surface that divides the second measuring beam into a second reference beam and a second test beam for measuring optical path length differences between the second reference surface and a second of the opposite sides of the test part. The first test beam has a primary transverse area that reflects from the first side of the test part and a secondary transverse area that reflects from the second reference surface of the second interferometer. The second test beam has a transverse area that reflects from the second side of the test part. The imaging subsystem images interference patterns formed between (a) the first reference surface and the first side of the test part by the first measuring beam, (b) the second reference surface and the second side of the test part by the second measuring beam, and (c) the first reference surface and the second reference surface by the first measuring beam for locating the first and second sides of the test part with respect to both the first and second reference surfaces.

The imaging subsystem can include (a) a first camera that simultaneously records images of the interference patterns formed between the first reference surface and the first side of the test part and between the first reference surface and the second reference surface, and (b) a second camera that records an image of the interference pattern formed between the second reference surface and the second side of the test part. A first beamsplitter preferably directs the first measuring beam toward the first reference surface, the first side of the test part, and the second reference surface and redirects the first measuring beam from the first reference surface, the first side of the test part, and the second reference surface to the first camera. A second beamsplitter preferably directs the second measuring beam toward the second reference surface and the second side of the test part and redirects the second measuring beam from the second reference surface and the second side of the test part to the second camera. The first and second beamsplitters are preferably polarizing beamsplitters and work in conjunction with both a first polarization modifying element located between the first beamsplitter and the first reference surface for redirecting the reflected first measuring beam to the first camera and a second polarization modifying element located between the second beamsplitter and the second reference surface for redirecting the reflected second measuring beam to the second camera. The first and second polarization modifying elements preferably provide for opposite-direction polarization rotation for isolating the first measuring beam from the second camera and for isolating the second measuring beam from the first camera.

Alternatively, a beamsplitter can be used that divides the light source into the first and second measuring beams and redirects the reflected first and second measuring beams to the imaging subsystem. The beamsplitter is preferably a polarizing beamsplitter and works in conjunction with a first polarization modifying element located between the beamsplitter and the first reference surface for redirecting the reflected first measuring beam to the imaging subsystem and a second polarization modifying element located between the beamsplitter and the second reference surface for redirecting the reflected second measuring beam to the imaging subsystem. The polarization modifying elements preferably provide for cumulative polarization rotation for directing reflected portions of the first and second measuring beams to the imaging subsystem and for preventing other portions of the first and second measuring beams that transmit through both reference surfaces from reaching the imaging subsystem. The beamsplitter can be a first of two beamsplitters. The second beamsplitter directs the reflected first measuring beam to a first camera and directs the reflected second measuring beam to a second camera.

The transverse area of the second test beam can be divided similar to the first test beam into a primary transverse area that reflects from the second side of the test part and a secondary transverse area that reflects from the first reference surface. The imaging subsystem can be further arranged for also imaging interference patterns formed between the first reference surface and the second reference surface by the second measuring beam.

Thus, both of the first and second interferometers can be arranged for producing interference patterns between the first and second reference surfaces. The first interferometer preferably forms the interference pattern between the first and second reference surfaces simultaneously with the interference pattern between the first reference surface and the first side of the test part. The second interferometer preferably forms the interference pattern between the first and second reference surfaces simultaneously with the interference pattern between the second reference surface and the second side of the test part. Since both interferometers relate the two reference surfaces to each other and to their respective measures of the test part, the opposite sides of the test part can be measured in succession, while still being accurately related to each other; because variations in the relationship of the test part to the reference surfaces that occur between the opposite-side measurements can be resolved with respect to the accompanying measurements between the two reference surfaces. Prior to mounting the test parts, the redundant measures can be used to further calibrate the two interferometers or to measure any deviations from the intended form of the reference surfaces.

Another version of the invention as a method of measuring opposite side surfaces of a test part and of locating the opposite side surfaces of the test part with respect to each other includes mounting the test part between a first reference surface of a first interferometer and a second reference surface of a second interferometer. A first measuring beam propagates through the first interferometer, and a second measuring beam propagates through the second interferometer. A first reference beam portion of the first measuring beam reflects from the first reference surface, and a first test beam portion of the first measuring beam transmits through the first reference surface. A primary transverse area of the first test beam reflects from a first side surface of the test part, and a secondary transverse area of the first test beam reflects from the second reference surface. Interference patterns formed by the first measuring beam between the first reference surface and the first side surface of the test part and between the first reference surface and the second reference surface are simultaneously imaged.

In addition, a second reference beam portion of the second measuring beam reflects from the second reference surface, and a second test beam portion of the second measuring beam transmits through the second reference surface. A primary transverse area of the second test beam reflects from a second side surface of the test part. An interference pattern formed by the second measuring beam between the second reference surface and the second side surface of the test part is imaged. The two interference patterns formed by the first measuring beam and the interference pattern formed by the second measuring beam are processed for measuring the first and second side surfaces of the test part and for locating the first and second side surfaces of the test part with respect to each other.

Preferably, the method also includes reflecting a secondary transverse area of the second test beam from the first reference surface and simultaneously imaging the interference pattern formed by the second measuring beam between the second reference surface and the second side of the test part together with an interference formed by the second measuring beam between the first and second reference surfaces. The accompanying step of processing also includes processing the interference pattern formed by the second measuring beam between the first and second reference surfaces for separately locating the first and second side surfaces of the test part with respect to each of the first and second reference surfaces. As a result, the steps of simultaneously imaging the interference patterns formed by the first measuring beam and simultaneously imaging the interference patterns formed by the second measuring beam can be performed in succession.

For unambiguously measuring distances, the first measuring beam is preferably shifted through a plurality of different wavelengths and the step of simultaneously imaging interference patterns formed by the first measuring beam includes simultaneously imaging interference patterns formed by the first measuring beam at each of the plurality of different wavelengths. The accompanying step of processing includes processing the interference patterns formed by the first measuring beam at the plurality of different wavelengths for measuring unambiguous distances between the first reference surface and the first side surface of the test part and between the first and second reference surfaces.

The wavelength of the second measuring beam can also be shifted through a plurality of different wavelengths, and the step of imaging interference patterns formed by the second measuring beam can be similarly expanded to include imaging interference patterns formed by the second measuring beam at each of the plurality of different wavelengths. The step of processing can also be expanded to include processing the interference patterns formed by the second measuring beam at the plurality of different wavelengths for measuring unambiguous distances between the second reference surface and the second side surface of the test part.

BRIEF DESCRIPTIONS OF THE DRAWING FIGURES

FIG. 2 is an enlarged diagram of a shared measuring cavity between the two common-path interferometers.

FIG. 3A depicts interference patterns formed by a first of the two interferometers between one side of the part and a reference surface of the first interferometer and between the two reference surfaces of the two interferometers.

FIG. 3B depicts interference patterns formed by a second of the two interferometers between the other side of the part and a reference surface of the second interferometer and between the two reference surfaces of the two interferometers.

DETAILED DESCRIPTION OF THE INVENTION

Figure 1:
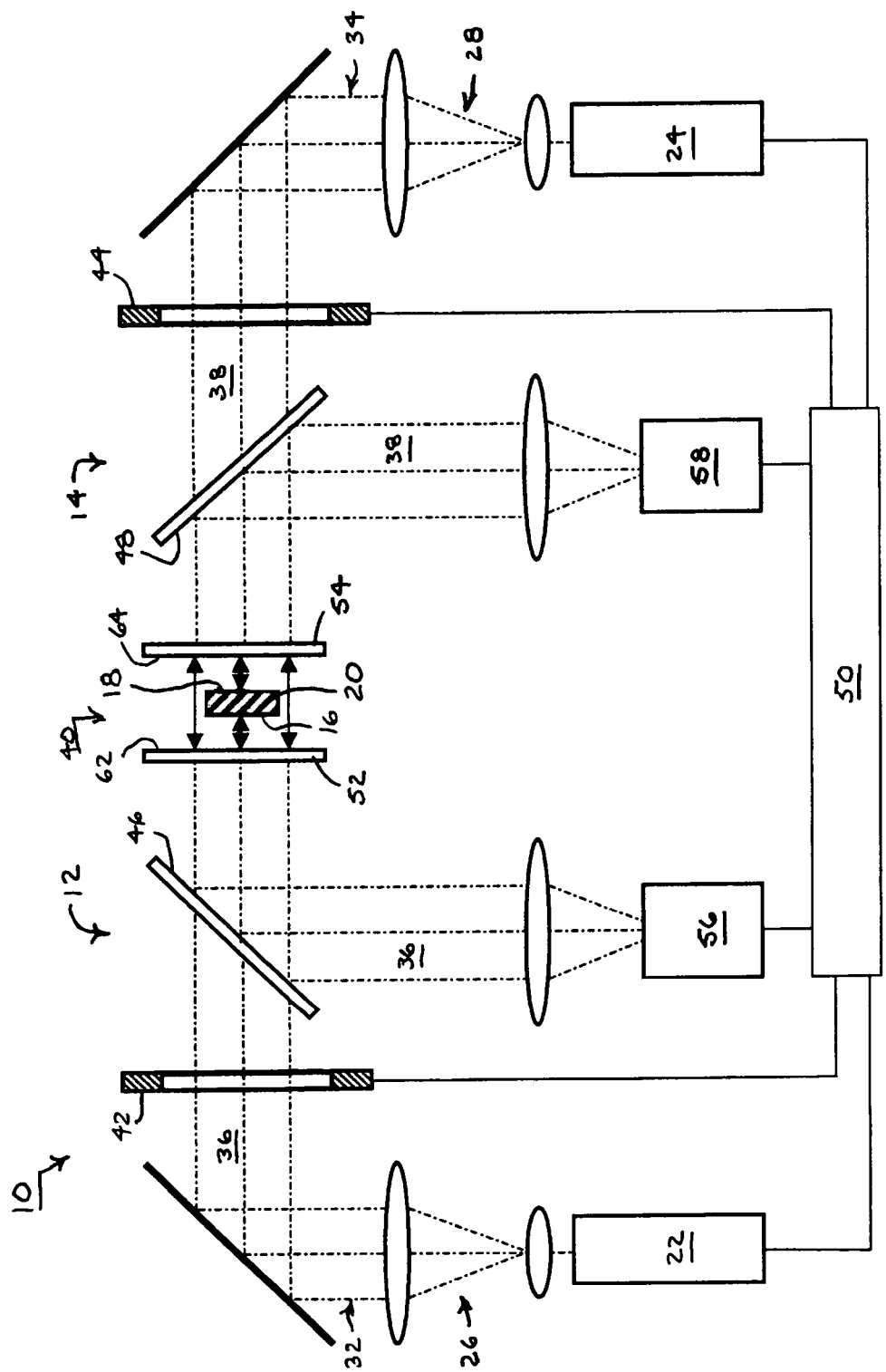
FIG. 1 is a diagram of an interferometric system including two overlapping common-path interferometers having separate light sources and cameras for taking measurements of opposite sides of an opaque test part.

An interferometric measuring system 10 combining first and second common-path interferometers 12 and 14 for measuring opposite first and second sides 16 and 18 of an opaque test part 20 appears in FIG. 1. The opaque test part 20 can be a part that is made of materials that are not transmissive within the range of frequencies propagated by the common-path interferometers or that is sufficiently diffuse to preclude the ordered transmission of such frequencies. The first and second interferometers 12 and 14 include respective first and second light sources 22 and 24 and first and second beam shapers 26 and 28. The first and second light sources 22 and 24 are preferably frequency-tunable light sources for producing respective first and second measuring beams 32 or 34 that can be varied through a succession of different wavelengths for carrying out frequency-shifting interferometry. The first and second beam shapers 26 and 28 preferably include beam expanders and collimators for establishing predetermined transverse dimensions of the first and second measuring beams 32 and 34.

The first and second light sources 22 and 24 are preferably semiconductor diode lasers with adjustable feedback systems for shifting the lasing frequencies through a succession of different frequencies. Examples of such frequency-tunable light sources that are particularly suitable for carrying out the invention are disclosed in co-assigned U.S. patent application Ser. No. 10/946,692, entitled Mode-Selective Frequency Tuning System, which is hereby incorporated by reference. Other examples are disclosed in U.S. Pat. No. 6,690,690, entitled Tunable Laser System having an Adjustable External Cavity, which is also hereby incorporated by reference.

Within their respective first and second interferometers 12 and 14, the first and second measuring beams 32 and 34 propagate along first and second common optical pathways 36 and 38 through first and second shutters 42 and 44 and first and second beamsplitters 46 and 48 before reaching respective first and second divider plates 52 and 54. Opening and closing of the first and second shutters 42 and 44 are preferably coordinated by a common processor/controller 50 for alternately blocking the propagation of light from one or the other of the first and second light sources 22 or 24 to prevent light from one interferometer 12 or 14 from mixing with the light from the other interferometer 14 or 12. The first and second beamsplitters 46 and 48 transmit portions of the first and second measuring beams 32 and 34 along the first and second common pathways 36 and 38 to the first and second divider plates 52 and 54 and reflect returning portions of the first and second measuring beams 32 and 34 from the first and second divider plates 52 and 54 along the first and second common optical pathways 36 and 38 to respective first and second cameras 56 and 58, which are included in an imaging subsystem. The first and second beamsplitters 46 and 48 can take the form of pellicle beamsplitters, beamsplitter cubes, or beamsplitter plates based on splitting amplitude or polarization. The cameras 56 and 58 preferably include detector arrays for measuring beam intensity throughout a field of view along with any imaging optics for imaging the opposite sides of the test part 20.

The first and second common pathways 36 and 38 of the first and second interferometers 12 and 14 extend from the beamsplitters 46 and 48 in one direction to the first and second divider plates 52 and 54 and in another direction to the first and second cameras 56 and 58. As better seen in FIG. 2, the first and second divider plates 52 and 54 include respective first and second reference surfaces 62 and 64 that divide the first and second measuring beams 32 and 34 into first and second test beams 66 and 68 and first and second reference beams 72 and 74. The first and second reference surfaces 62 and 64 retroreflect the first and second reference beams 72 and 74 back along the first and second common optical pathways 36 and 38 and transmit the first and second test beams 66 and 68 toward the opposite first and second sides 16 and 18 of the opaque test part 20. The divider plates 52 and 54 can take the form of Fizeau objectives or windows and are made of substantially transmissive optical materials. However, the reference surfaces 62 and 64, which are preferably planar, are both partially reflective and partially transmissive. The partial reflectivity is required for reflecting the reference beams 72 and 74, and the partial transmissivity is required for twice transmitting the test beams 66 and 68. Both reference surfaces 62 and 64 preferably extend normal to a common optical axis and straddle the opaque part 20 along the common optical axis. Outer surfaces 61 and 65 of the divider plates 52 and 54 are preferably made either antireflective or relatively inclined, as shown, to avoid producing additional reflections propagating along the measuring paths.

The two reference surfaces 62 and 64 define between them a shared measuring cavity 40 within which the two interferometers 12 and 14 overlap. Except within the shared measuring cavity 40, the test and reference beam portions of the respective measuring beams 32 and 34 overlap each other, so the effects of disturbances within the common path interferometers 12 and 14 are mitigated. Within the shared measuring cavity, portions of the test beams 66 and 68 overlap each other as a basis for relating measurements taken by the two interferometers 12 and 14. The first test beam 66 of the first common-path interferometer 12 propagates beyond the reference surface 62 along a first test pathway 76. A primary transverse area 70 (apparent within the image of FIG. 3A) of the first test beam 66 reflects from the first side 16 of the opaque test part 20, and a secondary transverse area 71 of the first test beam 66 reflects from the second reference surface 64 of the second common-path interferometer 14. The second test beam 68 of the second common path interferometer 14 propagates beyond the reference surface 64 along a second test pathway 78 and has a primary transverse area 80 (apparent within the image of FIG. 3B) that reflects from the second side 18 of the opaque test part 20 and a secondary transverse area 81 that reflects from the first reference surface 62 of the first common-path interferometer 12. Thus, the secondary transverse areas 71 and 81 of the first and second test beams overlap along the entire first and second test pathways 76 and 78 across the shared measuring cavity 40 between the reference surfaces 62 and 64 of the two interferometers 12 and 14. The primary transverse areas 70 and 80 of the first and second test beams 66 and 68 longitudinally overlap the secondary transverse areas 71 and 81 of the same test beams 66 and 68 but do not overlap each other.

Upon respective reflections, the first test beam 66 recombines with the first reference beam 72 at the first reference surface 62 producing a primary interference pattern 82 between the first reference surface 62 and the first side 16 of the test part 20 within the primary transverse area 70 of the first test beam 66 and a secondary interference pattern 83 between the first reference surface 62 and the second reference surface 64 within the secondary transverse area 71 of the first test beam 66. Upon similar respective reflections, the second test beam 68 recombines with the second reference beam 74 at the second reference surface 64 producing a primary interference pattern 84 between the second reference surface 64 and the second side 18 of the test part 20 within the primary transverse area 80 of the second test beam 68 and a secondary interference pattern 85 between the second reference surface 64 and the first reference surface 62 within the secondary transverse area 81 of the second test beam 68. The first camera 56 simultaneously records images of the primary and secondary interference patterns 82 and 83 produced by the first common-path interferometer 12, and the second camera 58 simultaneously records images of the primary and secondary interference patterns 84 and 85 produced by the second common-path interferometer 14.

Normally, interference patterns, which record intensity variations caused by interference between test and reference beams, have a very limited ambiguity interval through which the intensity variations can be interpreted as variations in distance. Unless assumptions can be made about surface form, the ambiguity interval as a measure of surface height variation is generally limited to around one-half of the measuring beam wavelength. In the visible range, this is well under one micron, which is much too small for measuring contemplated distances (measured in millimeters) across the shared measuring cavity 40 containing the test part 20.

Accordingly, the two common path interferometers 12 and 14 are preferably arranged for gathering additional information for extending the ambiguity interval of measurement into a more useful range for measuring distances across the shared measuring cavity 40. The preferred approach involves arranging at least one and preferably both of the interferometers 12 and 14 as a frequency-shifting interferometer that gathers interference data over a range of different measuring beam wavelengths. Pixel intensities within interference fringe patterns produced by interfering beams vary in an orderly manner through cycles of constructive and destructive interference as a result of progressive changes in beam frequency, and the cycle rate of change is proportional to the optical path length difference between the interfering beams. The processor/controller 50 is preferably arranged in connection with the cameras 56 and 58 to incorporate a frame grabber to record interference patterns imaged onto the detector arrays of the cameras 56 and 58 at each of the plurality of different measuring beam frequencies. Intensity data from each pixel is preferably arranged in a set and referenced (e.g., by virtue of its order) to the measuring beam frequency at which it was produced. The additional information related to the rate of pixel intensity changes as a function of measuring beam frequency is evaluated within the processor 50 to resolve interferometric measurements of distance over much larger ranges.

One example of a frequency-shifting interferometer appropriate for use with this invention is described in U.S. patent application Ser. No. 10/465,181, entitled Common-Path Frequency-Scanning Interferometer, which is hereby incorporated by reference. Further descriptions of the processing involved are found in U.S. Pat. No. 6,741,361, entitled Multi-Stage Date Processing for Frequency-Scanning Interferometer, and in U.S. patent application Ser. No. 10/946,690, entitled Phase-Resolved Measurement for Frequency-Shifting Interferometry, which are both incorporated by reference.

The first interferometer 12 measures optical path length differences $P_1$ between corresponding points on the first reference surface 62 and the first side surface 16 of the test part 20 as well as optical path length differences $R_1$ between corresponding points on the first reference surface 62 and the second reference surface 64. The second interferometer 14 measures optical path length differences $P_2$ between corresponding points on the second reference surface 64 and the second side surface 18 of the test part 20 as well as optical path length differences $R_2$ between corresponding points on the second reference surface 64 and the first reference surface 62.

The two interferometric measures $P_1$ and $P_2$ of the first and second side surfaces 16 and 18 can be combined with either measure $R_1$ or $R_2$ of the first and second reference surfaces 62 and 64 for relating the measurements of the two side surfaces 16 and 18 to each other, such as for calculating the parameters of thickness t and parallelism between the side surfaces 16 and 18. The measurement of distances between the corresponding points on the first and second reference surfaces 62 and 64 together with the assumed forms of the reference surfaces 62 and 64 allows for the calculation of distance measurements at other corresponding points between the reference surfaces that coincide with the points on the reference surfaces that correspond to the points on the first and second sides of the opaque parts. The processor 50 provides for measuring part thickness between corresponding points on the first and second sides 16 and 18 of the opaque parts by subtracting the respective measures of distances $P_1$ and $P_2$ between the corresponding points on the first and second sides 16 and 18 of the opaque parts and the first and second reference surfaces 62 and 64 from distances between the coinciding points on the first and second reference surfaces derived from the measures of the distances between other corresponding points on the first and second reference surfaces.

The second measure $R_1$ or $R_2$ of the first and second reference surfaces 62 and 64 is largely redundant but provides for monitoring any changes in the shared measuring cavity 40 of the two interferometers 12 and 14 between the measurements of the opposite side surfaces 16 and 18. Prior to mounting the test part 20 in place between the reference surfaces 62 and 64, the redundant measures of $R_1$ and $R_2$ allow the two interferometers 12 and 14 to be calibrated with respect to each other.

For example, the first interferometer 12 can be operated to the exclusion of the second interferometer 14 by closing the shutter 44, which prevents light of the second interferometer 14 from entering the first interferometer 12. Similarly, the second interferometer 14 can be operated to the exclusion of the first interferometer 12 by closing the shutter 42, which prevents light of the first interferometer 12 from entering the second interferometer 14. In place of a shutter, an aperture could be sized in relation to the part 20 to block light to one or the other of the secondary transverse areas 83 or 85.

The first and second laser light sources 22 and 24 can operate at the same or different beam frequencies. For example, the frequency range of one of the light sources 22 or 24 can be different from the frequency range of the other of the light sources 24 or 22. The frequency ranges of the two light sources 22 and 24 could overlap while the instantaneous frequencies output by the two light sources 22 and 24 could differ. In place of the shutters 42 and 44, one or more spectral filters could be used to prevent the adverse mixing of light between the two interferometers 12 and 14. Such spectral filters would preferably be located adjacent to or as a part of the cameras 56 and 58.

The mixing of light between the imaging systems of the two interferometers 12 and 14 is preferably avoided to maintain desired image contrast. However, despite such mixing, the interference patterns 82, 83, 84, and 85 could still be evaluated by discounting elevated background levels of light. For example, the interferometric measuring system 10 could be operated without the shutters 42 and 44 by adapting the cameras 56 and 58 or their associated processing software to accommodate, e.g., subtract out, the elevated levels of background light exchanged between the interferometers 12 and 14.

Figure 4:
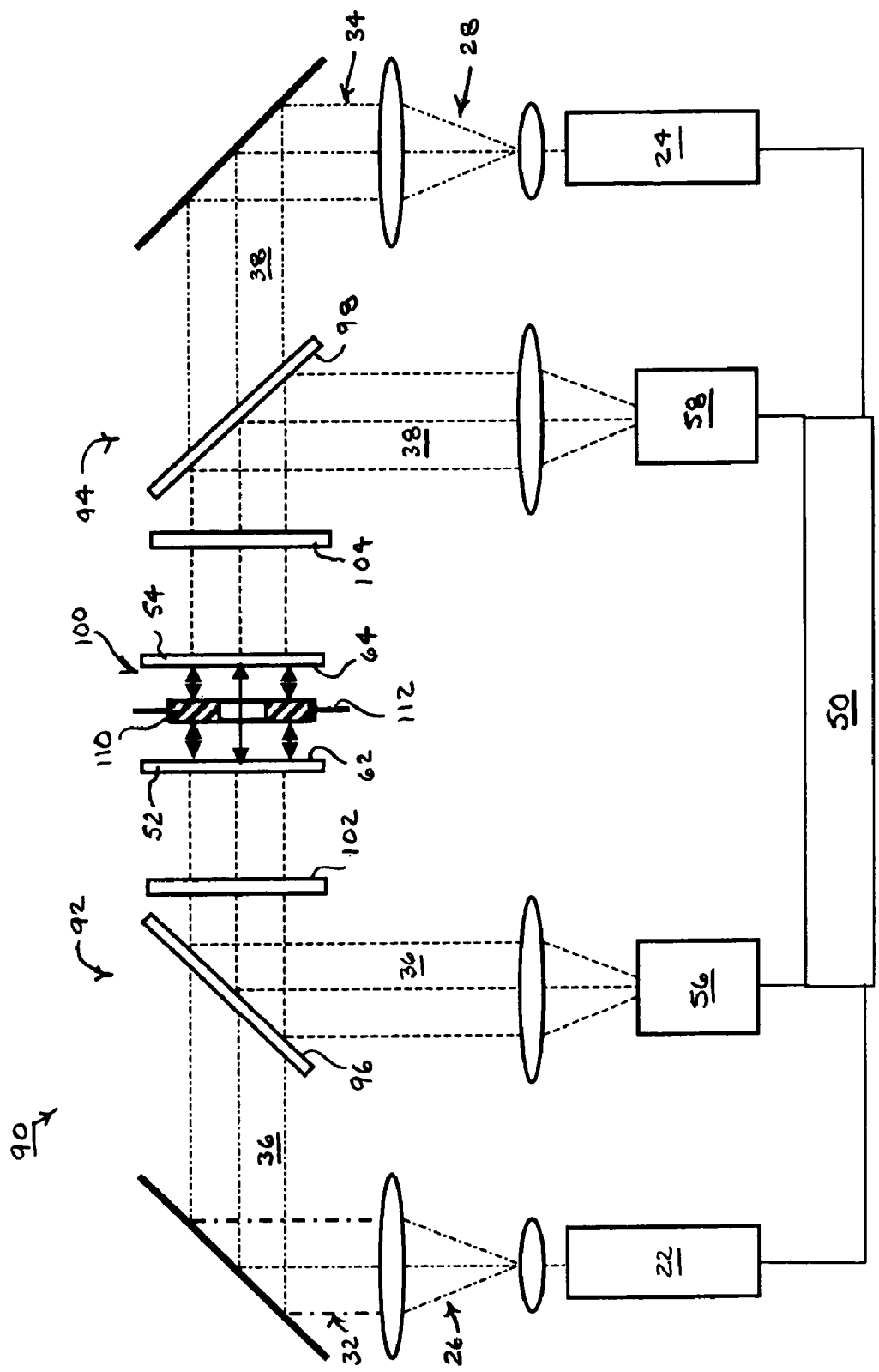
FIG. 4 is a diagram of an alternative interferometric system including two overlapping common-path interferometers having a polarization management system for separating the measurements taken by the two interferometers.

An alternative interferometric measuring system 90 is shown in FIG. 4 using polarization management for separating light between overlapping first and second common-path interferometers 92 and 94. Similar reference numerals are applied to elements in common with the interferometric measuring system 10.

In place of shutters, the measuring system 90 includes respective complementary first and second polarization modifying elements 102 and 104 in combination with first and second polarizing beamsplitters 96 and 98. The first and second polarization modifying elements 102 and 104 are preferably one-quarter waveplates arranged complementary to each other (e.g. oriented with birefringent axes at +/−45 degrees). The first and second polarization beamsplitters 96 and 98 convert unpolarized light from the first and second light sources 22 and 24 into linearly polarized light by transmitting one orthogonal polarization component (e.g., s polarized light) and by reflecting (i.e., discarding) the other orthogonal polarization component (e.g., p polarized light). Pre-polarized light could also be used for initial transmission through the polarizing beamsplitters 96 and 98.

Upon first encountering the first and second polarization modifying elements 102 and 104, the respective measuring beams 32 and 34 are converted from linearly polarized light (e.g., s polarized light) to circularly polarized light. The returning circularly polarized light from a shared measuring cavity 100 is converted upon second encounters with the same first and second polarization modifying elements 102 and 104 into the orthogonal polarization component (e.g., p polarized light). The second encounters with the first and second polarizing beamsplitters 96 and 98 reflect the orthogonally polarized measuring beams 36 and 38 toward the respective first and second cameras 56 and 58.

Any of the circularly polarized light from the first interferometer 92 that passes through the shared measuring cavity 100 into the second interferometer 94 encounters the complementary polarization modifying element 104 that reverses the effect of the polarization modifying element 102 and transmits the linearly polarized light (e.g., s polarized light) through the polarizing beamsplitter 98 rather than reflecting the light toward the camera 58. Similarly, any of the circularly polarized light from the second interferometer 94 that passes through the shared measuring cavity 100 into the first interferometer 92 encounters the complementary polarization modifying element 102 that reverses the effect of the polarization modifying element 104 and transmits the linearly polarized light (e.g., s polarized light) through the polarizing beamsplitter 96 rather than reflecting the light toward the camera 56.

Figure 5:
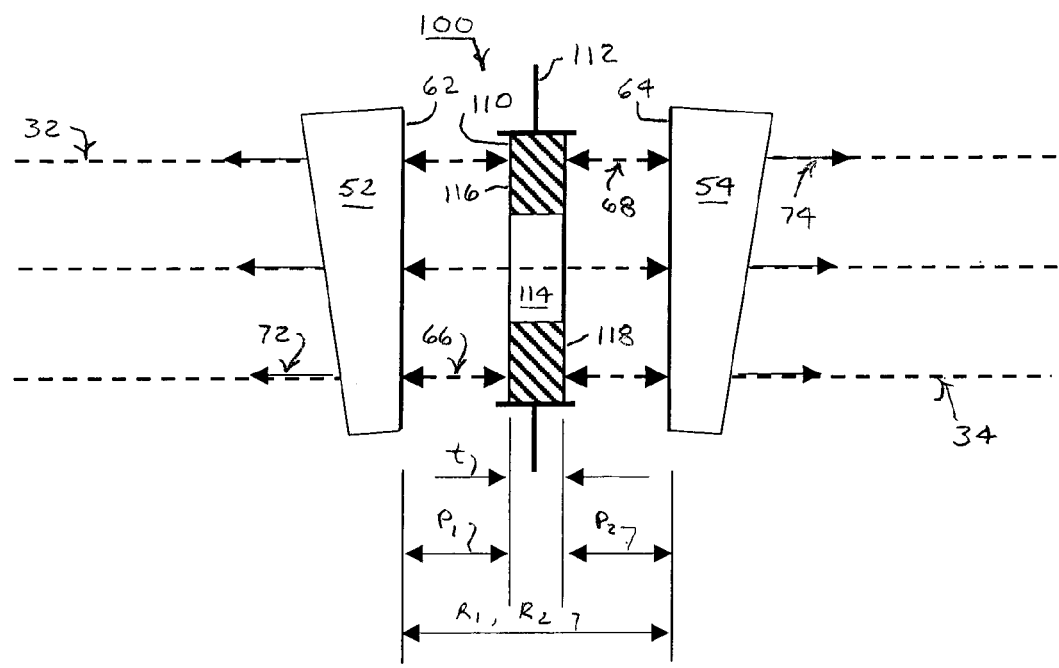
FIG. 5 is an enlarged diagram of a shared measuring cavity between the two common-path interferometers of FIG. 4.

An alternative test part 110 is mounted on a support fixture 112 within the measuring cavity 100. The support fixture 112 for the test part 110, along with support fixtures for any of the other test parts contemplated by the invention, can take a variety of forms, including peripheral supports as shown or supports on either side of the test parts. As better seen in FIG. 5, the test part 110 has an annular shape with a hollow center portion 114. Similar to the previous embodiments, the reference surfaces 62 and 64 reflect first and second reference beam portions 72 and 74 of the first and second measuring beams 32 and 34 and transmit first and second test beam portions 66 and 68.

Figures 6A, 6B:
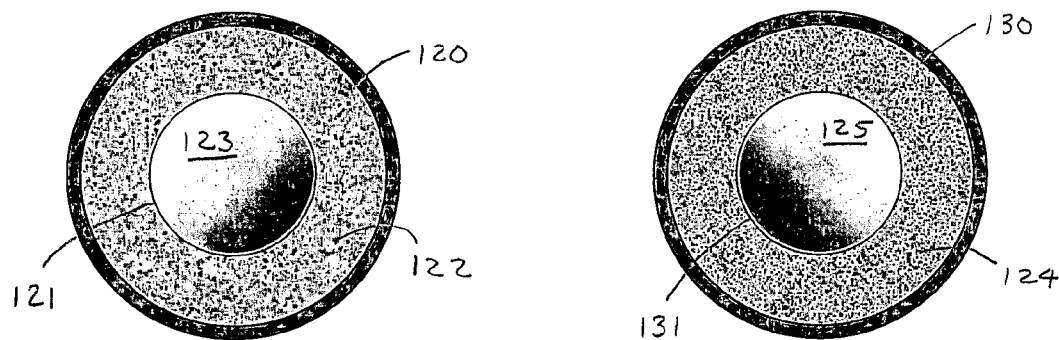
FIG. 6A depicts interference patterns formed by a first of the two interferometers of FIG. 5 between one side of the part and a reference surface of the first interferometer and between the two reference surfaces of the two interferometers.
FIG. 6B depicts interference patterns formed by a second of the two interferometers of FIG. 5 between the other side of the part and a reference surface of the second interferometer and between the two reference surfaces of the two interferometers.

The first test beam 66 has a primary transverse area 120 (apparent within the image of FIG. 6A) having an annular shape matching the annular shape of a first side surface 116 of the test part 120 and a secondary transverse area 121 matching the circular shape of the hollow center portion 114 of the test part 110. The primary transverse area 120 of the first test beam 66 reflects from the first side surface 116 of the test part 120. The secondary transverse area 121 passes through the hollow center portion 114 of the test part 110 and reflects from the second reference surface 64. Imaged onto a detector array of the camera 56 is a primary interference pattern 122 formed between the reflections from the first reference surface 62 and the first side surface 16 of the test part 120 and a secondary interference pattern 123 formed between the reflections from the first and second reference surfaces 62 and 64.

The second test beam 68 has a primary transverse area 130 (apparent within the image of FIG. 6B) having an annular shape matching the annular shape of a second side surface 118 of the test part 120 and a secondary transverse area 131 matching the circular shape of the hollow center portion 114 of the test part 110. The primary transverse area 130 of the second test beam 68 reflects from the second side surface 118 of the test part 120. The secondary transverse area 131 passes through the hollow center portion 114 of the test part 110 and reflects from the first reference surface 62. Imaged onto a detector array of the camera 58 is a primary interference pattern 124 formed between the reflections from the second reference surface 64 and the second side surface 118 of the test part 120 and a secondary interference pattern 125 formed between the reflections from the first and second reference surfaces 62 and 64.

The polarization management within the interferometric measuring system 90 allows the two cameras 56 and 58 to collect information about the first and second side surfaces 116 and 118 of the test part 112 simultaneously. Thus, both interferometers 92 and 94 are subject to the same temporally related changes (e.g., temperature). Although only one or the other of the secondary interference patterns 123 and 125 is required for spatially relating the measurements of the opposite side surfaces 116 and 118 to each other, the redundant measurements of the measuring cavity 100 provide for monitoring any disturbances that could affect the first and second interferometers 92 and 94 differently. If the two interferometers 92 and 94 provide approximately equivalent measurements of the measuring cavity 100 (i.e., distances between the reference surfaces 62 and 64) within a given tolerance, the measurements of the opposite side surfaces 116 and 118 of the test part 120 taken by the two interferometers 92 and 94 can be spatially related to each other with a high degree of confidence (e.g., within the same given tolerance). An average of the two measurements of the measuring cavity 100 can be used to more accurately relate the two reference surfaces 62 and 64 to each other for balancing any errors in the measurements. Alternatively, corrections can be made to the measurements of one or the other of the opposite side surfaces 116 and 118 based on systematic modifications required to better equate the two simultaneous measurements of the reference surfaces 62 and 64.

Figure 7:
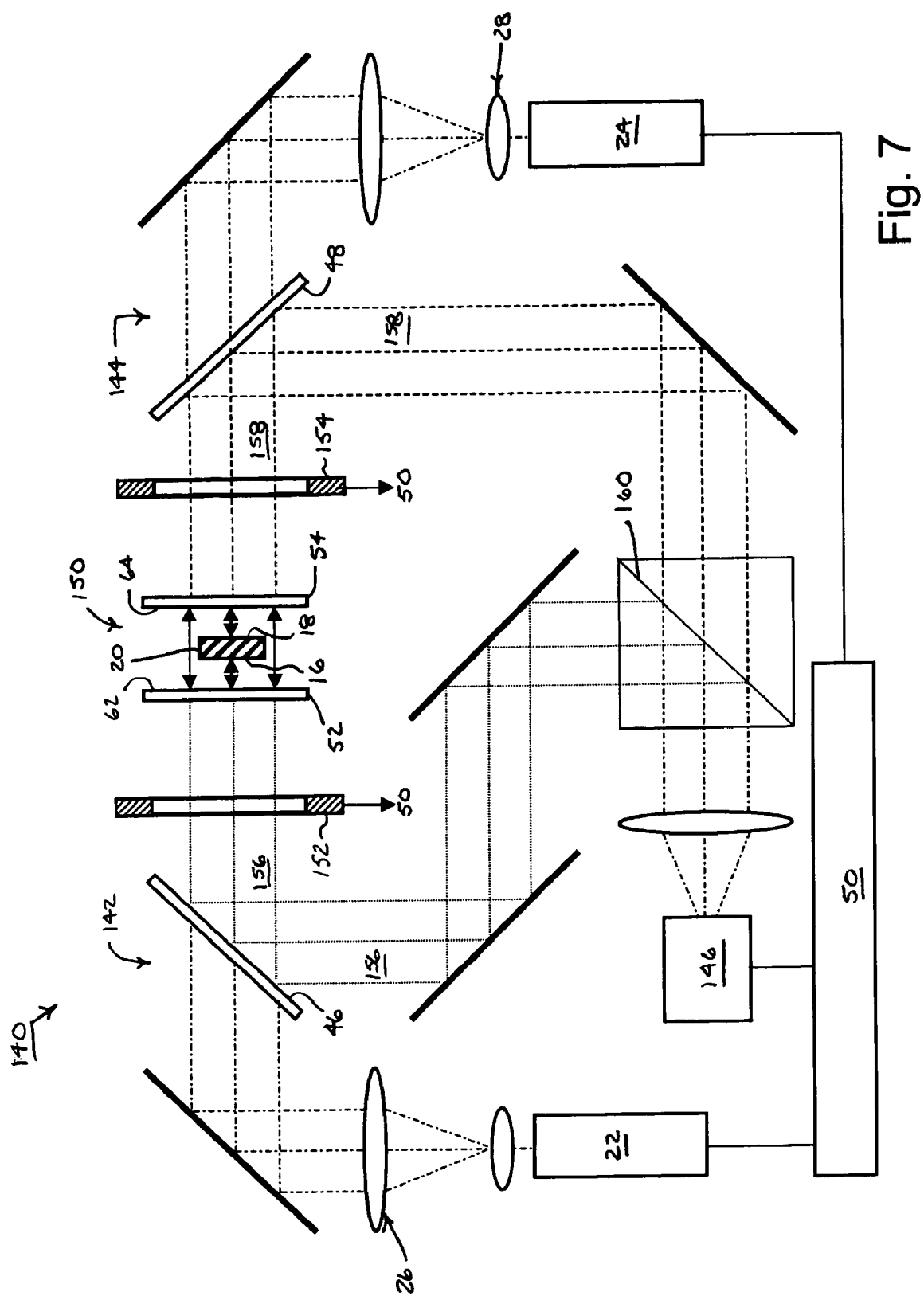
FIG. 7 is a diagram of an alternative interferometric system including two overlapping common-path interferometers that share a camera for alternately imaging opposite sides of the test part.

An alternative interferometric measuring system 140 shown in FIG. 7 gathers interferometric data from first and second common path interferometers 142 and 144 with a single camera 146. First and second shutters 152 and 154 provide for alternately blocking the propagation of light through the two interferometers 142 and 144. The shutters 152 and 154 are positioned along first and second common optical pathways 156 and 158 between a shared measuring cavity 150 of the two interferometers 142 and 144 and the camera 146 so that any light passing through the shared measuring cavity 150 from one interferometer 142 or 144 to the other 144 or 142 is blocked from reaching the camera 146.

A beamsplitter 160 combines the first and second common optical pathways 156 and 158 of the interferometers 142 and 144 so that both pathways 156 and 158, although interrupted by the shutters 152 and 154, lead to the single camera 146. Although the beamsplitter 160, together with the beamsplitters 46 and 48 are intended as intensity-dividing beamsplitters, polarizing beamsplitters could also be used to provide more efficient use of the light imparted by the light sources 22 and 24. For example, the beamsplitters 96 and 98, together with the polarization modifying elements 102 and 104 of the interferometric measuring system 90, could be used to direct more light from the measuring cavity 150 toward the camera 146. Provided that the polarization management of the two interferometers 142 and 144 propagates orthogonally polarized light between the two interferometers 142 and 144, the beamsplitter 160 could also be arranged as a polarizing beamsplitter for more efficiently directing light from each of the two interferometers 142 and 144 to the single camera 146.

Figure 8:
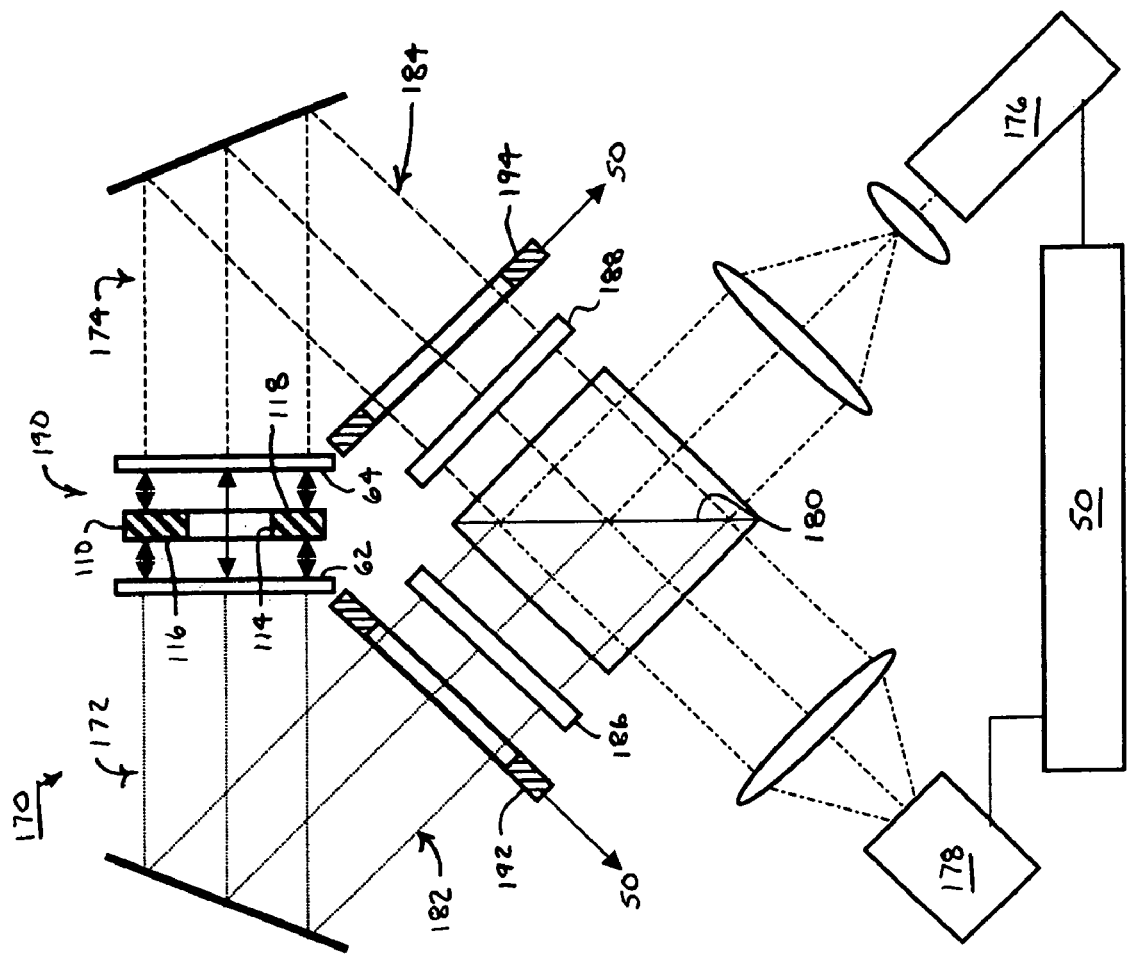
FIG. 8 is a diagram of an alternative interferometric system including two overlapping common-path interferometers that share both a light source and a camera.

An alternative interferometric measuring system 170 of FIG. 8 combines polarization management with beam blocking for operating two overlapping common-path interferometers 172 and 174 with a single light source 176 and a single camera 178. A polarizing beamsplitter 180 divides the output of the single light source 176 into first and second orthogonally polarized measuring beams 182 and 184 (e.g., as s polarized and p polarized light). Upon a first encounter, first and second polarization modifying elements 186 and 188 convert the linearly polarized light into circularly polarized light. First and second shutters 192 and 194 provide for alternately blocking the first and second measuring beams 182 and 184.

The first and second sides 116 and 118 of the hollow test part 110 are measured sequentially. For measuring the first side 116, the first shutter 192 is opened to allow the linearly polarized (e.g., s polarized) first measuring beam 182 to reach the shared measuring cavity 190, and the shutter 194 is closed for blocking the further propagation of the second measuring beam 184. Light reflected from the first side surface 116 of the test part 110 and from the second reference surface 64 combines with light reflected from the first reference surface 62 and propagates together back through the first shutter 192 and the first polarization modifying element 186, arriving back at the polarizing beamsplitter 180 as orthogonally linearly polarized (e.g., p polarized) light, which is reflected toward the camera 178. Similarly, for measuring the second side 118, the second shutter 194 is opened to allow the linearly polarized (e.g., p polarized) second measuring beam 184 to reach the shared measuring cavity 190, and the shutter 192 is closed for blocking the further propagation of the first measuring beam 182. Light reflected from the second side surface 118 of the test part 110 and from the first reference surface 62 combines with light reflected from the second reference surface 64 and propagates together back through the second shutter 194 and the second polarization modifying element 188, arriving back at the polarizing beamsplitter 180 as orthogonally linearly polarized (e.g., s polarized) light, which is transmitted toward the camera 178.

Thus, when the shutter 192 is open and the shutter 194 is closed, the camera 178 simultaneously records a primary interference pattern 120 (see FIG. 6A) between the first reference surface 62 and the first side surface 116 of the test part and a secondary interference pattern 121 between the first and second reference surfaces 62 and 64. Alternatively, when the shutter 194 is open and the shutter 192 is closed, the camera 178 simultaneously records a primary interference pattern 130 (see FIG. 6B) between the second reference surface 64 and the second side surface 118 of the test part and a secondary interference pattern 131 between the first and second reference surfaces 62 and 64.

The optical path lengths traveled by the first and second measuring beams 182 and 184 are approximately equal so that the same imaging system (e.g., the optics associated with the camera 178) can be used for imaging the opposite side surfaces 116 and 118 of the test part through the different interferometers 172 and 174. Although the measurements of the opposite side surfaces 116 and 118 are separated by time, the use of both the same light source 176 and the same camera 178 reduces systematic errors between the interferometers 172 and 174. The redundant measurements between the two reference surfaces 62 and 64 can be used to measure any temporally related effects on the measurements of the opposite side surfaces 116 and 118. Repeated measurements can also be taken to assess or compensate for the temporal effects.

Figure 9:
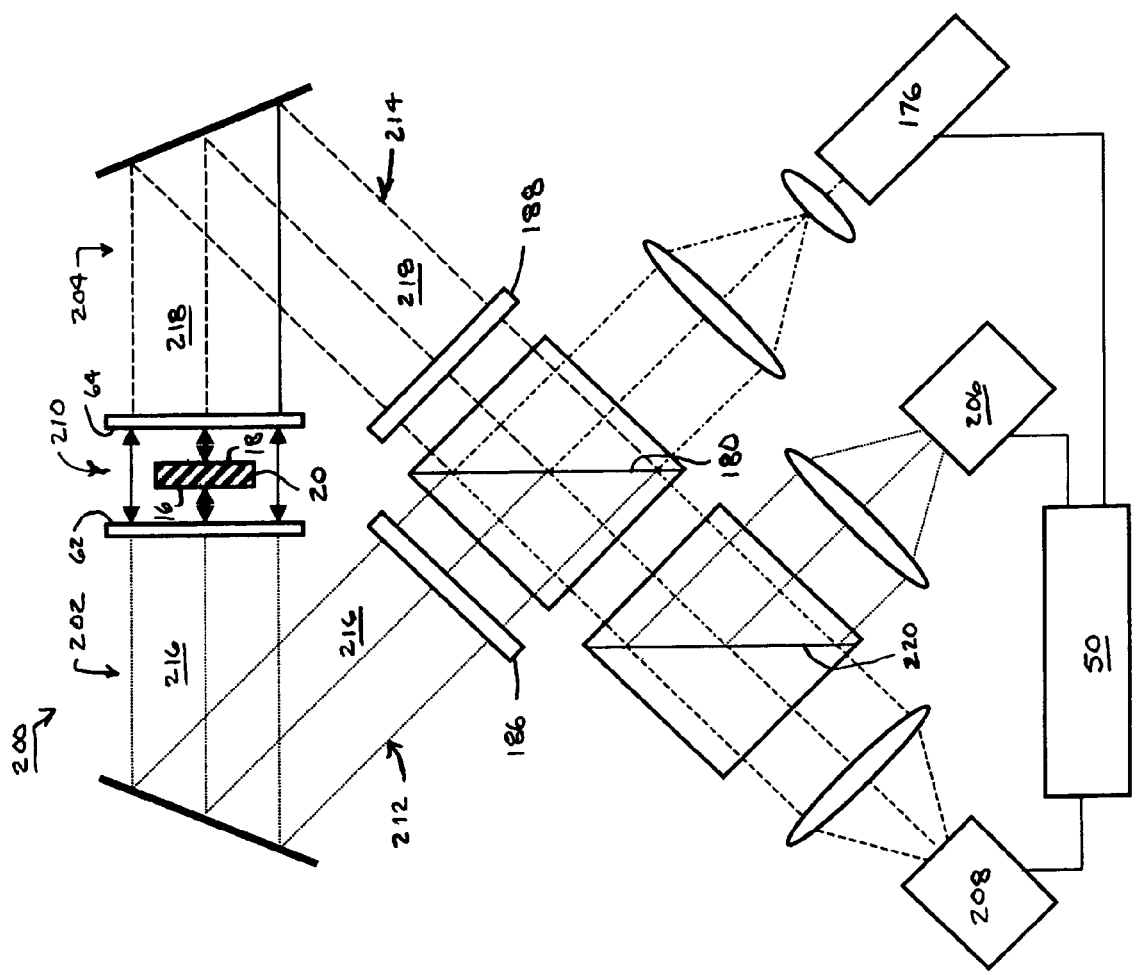
FIG. 9 is a diagram of an alternative interferometric system including two overlapping common-path interferometers that share a light source.

Another interferometric measuring system 200 for measuring the opposite sides 16 and 18 of the test part 20 is shown in FIG. 9. Again, two common-path interferometers 202 and 204 are arranged end to end across a shared measuring cavity 210. Both interferometers 202 and 204 share the single light source 176, but include first and second cameras 206 and 208 for simultaneously measuring the opposite sides 16 and 18 of the test part 20. Any one of the interferometric measuring systems 10, 90, or 140 could also be arranged with a single light source whose output is split by intensity or polarization into two measuring beams for separately propagating through overlapping interferometers.

In the measuring system 200, the polarizing beamsplitter 180 divides the output of the single light source 176 into first and second orthogonally polarized measuring beams 212 and 214 (e.g., as s polarized and p polarized light). Upon first encounters, the first and second polarization modifying elements 186 and 188 convert the linearly polarized light into circularly polarized light. Both measuring beams 212 and 214 propagate simultaneously toward the shared measuring cavity 210 along first and second common pathways 216 and 218 of the respective interferometers 202 and 204.

The first measuring beam 212 reflects from the first reference surface 62 as a reference beam and from the first side surface 16 of the test part and the second reference surface 64 as different transverse sections of a test beam. The reflected portions of the first measuring beam return along the same common pathway 216 through the polarization modifying element 186 a second time to the polarizing beamsplitter 180. The second encounter with the polarization modifying element 186 converts the returning first measuring beam 212 from circularly polarized light to orthogonally linearly polarized (e.g., p polarized) light, which reflects from the polarizing beamsplitter 180 toward a second polarizing beamsplitter 220 and the cameras 206 and 208. An unwanted portion of the first measuring beam could transmit through the shared measuring cavity 210 and enter the second interferometer 204, propagating toward the beamsplitter 180 along the second common pathway 218. An encounter with the polarization modifying element 188 produces results similar to the encounter with the modifying element 186 by converting the unwanted portion of the first measuring beam into orthogonally linearly polarized (e.g., p polarized) light. The unwanted portion of the first measuring beam approaches the beamsplitter 180 from a different direction and its subsequent reflection from the beamsplitter 180 directs the unwanted portion away from the cameras 206 and 208.

Simultaneously with the reflections of the first measuring beam 212, the second measuring beam 214 reflects from the second reference surface 64 as a reference beam and from the second side surface 18 of the test part and the first reference surface 62 as different transverse sections of a test beam. The reflected portions of the second measuring beam 214 return along the same common pathway 218 through the polarization modifying element 188 a second time to the polarizing beamsplitter 180. The second encounter with the polarization modifying element 188 converts the returning second measuring beam 214 from circularly polarized light to orthogonally linearly polarized (e.g., s polarized) light, which transmits through the polarizing beamsplitter 180 toward the second polarizing beamsplitter 220 and the cameras 206 and 208. An unwanted portion of the second measuring beam could transmit through the shared measuring cavity 210 and enter the first interferometer 192, propagating toward the beamsplitter 180 along the first common pathway 216. An encounter with the polarization modifying element 186 converts the unwanted portion of the second measuring beam into orthogonally linearly polarized (e.g., s polarized) light. The unwanted portion of the second measuring beam approaches the beamsplitter 180 from a different direction and transmits through the beamsplitter 180 in a direction away from the cameras 206 and 208.

The polarizing beamsplitter 220 reflects the returning linearly polarized (e.g., p polarized) portion of the first measuring beam 212 to the first camera 206 and transmits the returning linearly polarized (e.g., s polarized) portion of the second measuring beam 214 to the second camera 208. Thus, the two cameras 206 and 208 simultaneously record interference patterns similar to the interference patterns of FIGS. 3A and 3B as separately produced by the two overlapping interferometers 202 and 204, while polarization management is used to prevent unwanted light from adversely mixing between the interferometers 202 and 204.

Figure 10:
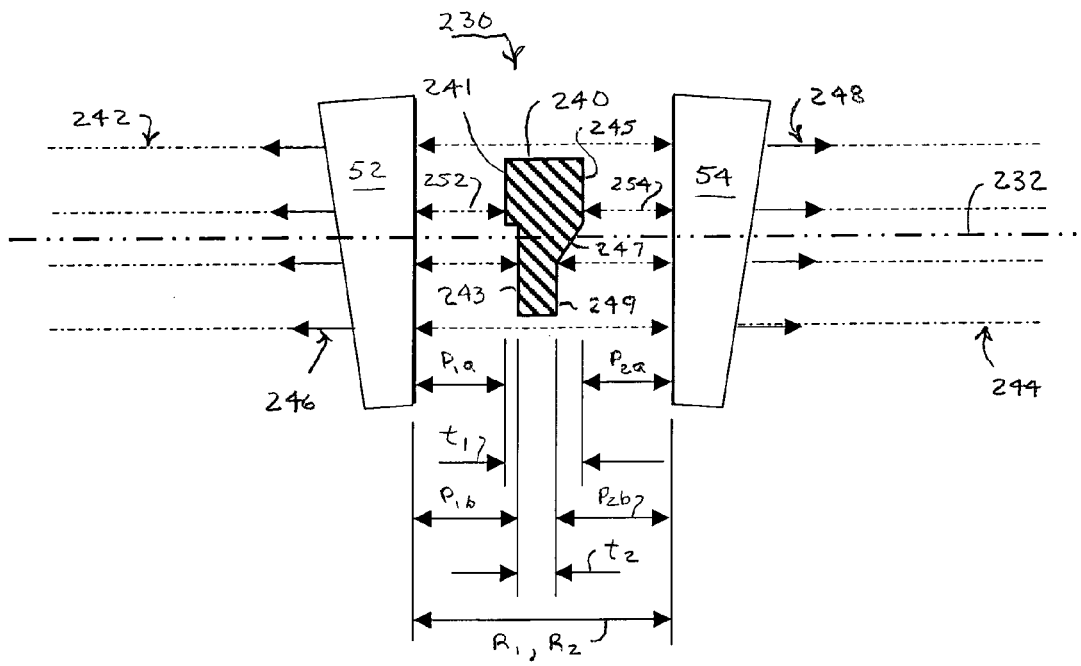
FIG. 10 is an enlarged diagram of a shared measuring cavity containing an opaque test part having multiple surfaces on each side.

FIG. 10 illustrates a shared measuring cavity 230 containing an opaque test part 240 having compound opposite side surfaces. For example, one side of the test part 240 includes first side surfaces 241 and 243, and an opposite side of the test part 240 includes second side surfaces 245, 247, and 249. The first side surfaces 241 and 243 and the second side surfaces 245 and 249 extend substantially parallel to one another but are variously offset along an optical axis 232 of the shared measuring cavity 230. The second side surface 247 is inclined to the other test part surfaces 241, 243, 245, and 249. The shared measuring cavity 230 can be incorporated into any one of the previously described interferometric measuring systems 10, 90, 140, 170, and 200.

Figures 11A, 11B:
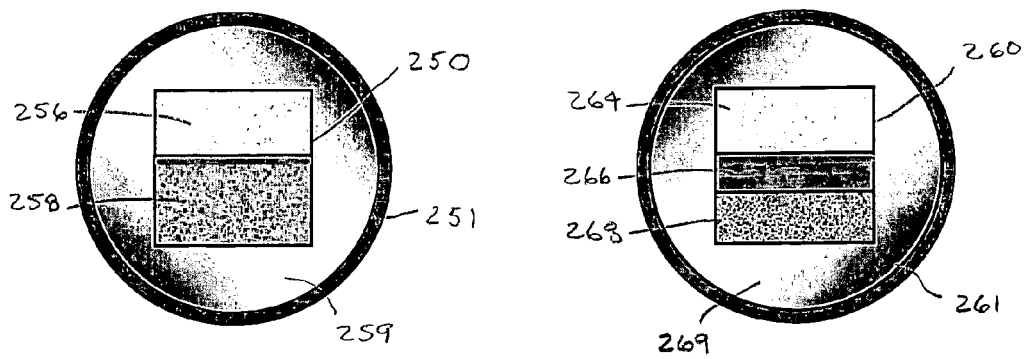
FIG. 11A depicts interference patterns formed by a first of two overlapping interferometers between the multiple surfaces on one side of the part and a reference surface of the first interferometer and between the two reference surfaces of the two interferometers.
FIG. 11B depicts interference patterns formed by a second of the two overlapping interferometers between the multiple surfaces on the other side of the part and a reference surface of the second interferometer and between the two reference surfaces of the two interferometers.

First and second measuring beams 242 and 244 are divided by the first and second reference surfaces 62 and 64 into reflected reference beams 246 and 248 and transmitted test beams 252 and 254. The test beam 252 has a primary transverse area 250 (apparent in the image of FIG. 11A) that reflects from the two first side surfaces 241 and 243 and a surrounding secondary transverse area 251 that reflects from the second reference surface 64. The test beam 254 has a primary transverse area 260 (apparent in the image of FIG. 11B) that reflects from the three second side surfaces 245, 247, and 249 and a surrounding secondary transverse area 261 that reflects from the first reference surface 62.

After so reflecting, the first test beam 252 recombines with the first reference beam 246 and produces a first primary interference pattern 256 between the first side surface 241 and the first reference surface 62, a second primary interference pattern 258 between the first side surface 243 and the first reference surface 62, and a secondary interference pattern 259 between the first and second reference surfaces 62 and 64. The second test beam 254 recombines with the second reference beam 248 and produces a first primary interference pattern 264 between the second side surface 245 and the second reference surface 64, a second primary interference pattern 266 between the second side surface 247 and the second reference surface 64, a third primary interference pattern 268 between the second side surface 249 and the second reference surface 64, and a secondary interference pattern 269 between the first and second reference surfaces 62 and 64.

By varying the measuring beam frequency and processing rates of change in accordance with frequency-shifting interferometry, the interference patterns 256 and 258 can be converted into measurements $P_{1a}$ and $P_{1b}$ of distance between the first side surfaces 241 and 243 from the first reference surface 62, the interference patterns 264, 266, and 268 can be converted into distance measurements $P_{2a}$ and $P_{2b}$ and the transition between them taken between the second side surfaces 245, 247, and 249 and the second reference surface 64, and the interference patterns 259 and 269 can be converted into redundant distance measurements $R_1$ and $R_2$ between the first and second reference surfaces 62 and 64. Based on these measurements, further processing can be used to resolve distances between the opposite side surfaces 241, 243 and 245, 247, and 249 such as the distances $t_1$ and $t_2$. In fact, the opposite side surfaces 241, 243 and 245, 247, and 249 can be related to a common datum, such as either of the reference surfaces 62 or 64 for constructing a three-dimensional model of the test part 240.

Figure 12:
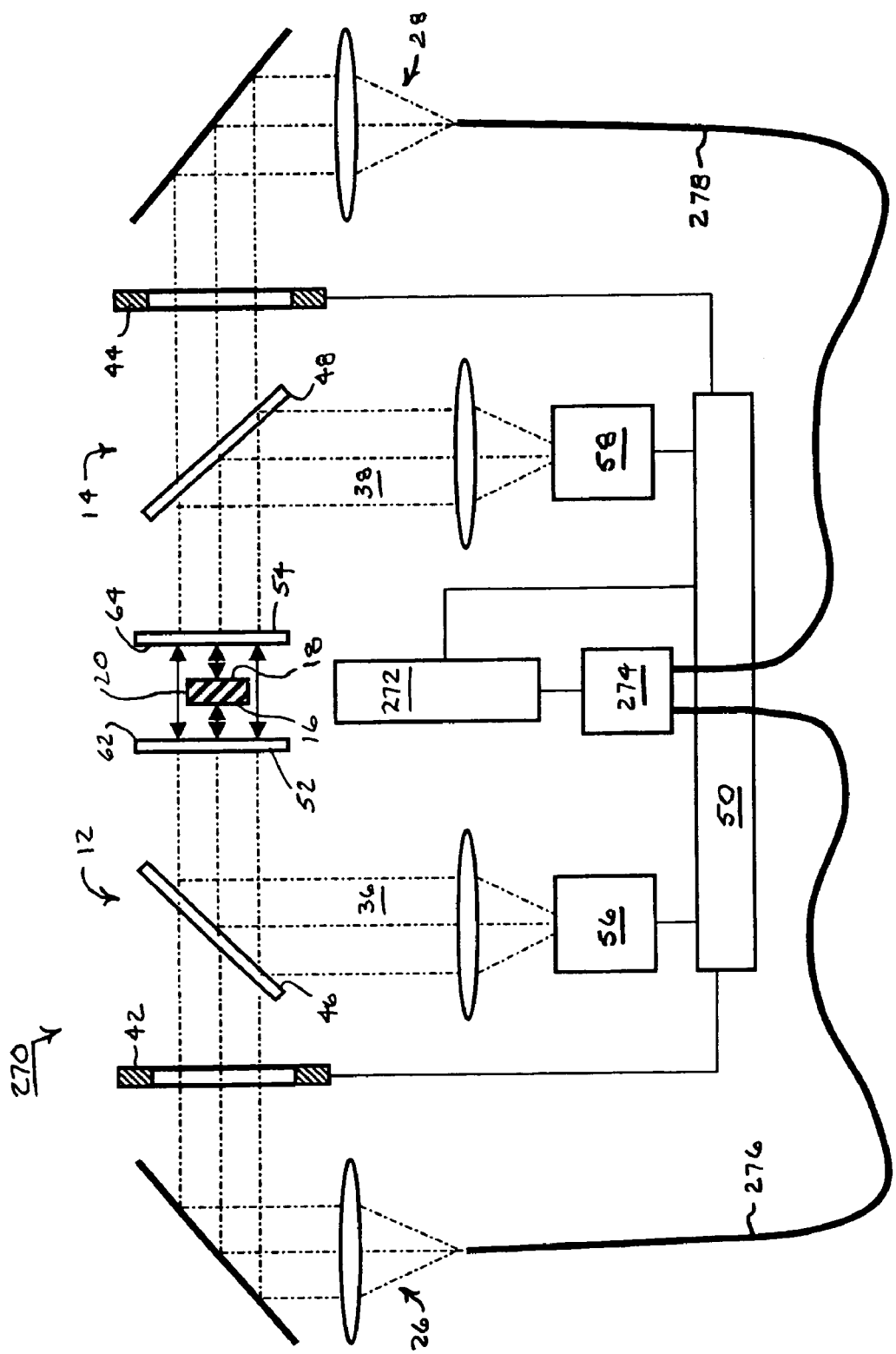
FIG. 12 is a diagram of an alternative interferometric system including two overlapping common-path interferometers sharing a common light source through two optical fibers.

As shown in FIG. 12, a single laser light source 272 (which can be similar to any of those already described) of another interferometric measuring system 270 can be arranged together with a beamsplitter 274 for supplying light to the two interferometers 12 and 14 through optical fibers 276 and 278. Preferably, the optical fibers 276 and 278 are single-mode fibers for providing single point sources for both interferometers 12 and 14. The optical fibers 276 and 278 allow more flexibility for orienting and locating the laser light source 272, such as within a common enclosure with the processor 50.

Although described with respect to a number of particular embodiments, those of skill in the art will appreciate that many variations are possible in accordance with the overall teaching of the invention. For example, the reference surfaces of the illustrated shared measuring cavities straddle the test parts in a horizontal direction, but the references surfaces could also be oriented for straddling test parts in a vertical plane or in any other orientation appropriate to the specific purposes of the application.

What is claimed is:

1. An interferometric system for measuring opposite side surfaces of opaque parts both individually and with respect to each other, comprising:
  a first interferometer having a first reference surface;
  a second interferometer having a second reference surface;
  the first and second reference surfaces being located within a field of view of at least the first of the interferometers;
  the first interferometer being positioned for measuring unambiguous distances between corresponding points on a first side of the opaque parts and the first reference surface;
  the second interferometer being positioned for measuring unambiguous distances between corresponding points on a second side of the opaque parts and the second reference surface;
  the first interferometer also being positioned for measuring unambiguous distances between corresponding points on the first and second reference surfaces; and
  a processor that relates the relative measurements of the first and second sides of the opaque parts with respect to each other based on the measurement of the unambiguous distances between the reference surfaces and calculates unambiguous distances between the corresponding points on the first and second sides of the opaque parts.

2. The system of claim 1 further comprising a mount for positioning the opaque parts between the first and second reference surfaces.

3. The system of claim 2 in which the first and second reference surfaces are both partially transmissive and partially reflective.

4. The system of claim 3 in which the first interferometer has a first reference path that includes reflections from the first reference surface and a first test path that includes transmissions to and from the first side of the opaque parts through the first reference surface, and the second interferometer has a second reference path that includes reflections from the second reference surface and a second test path that includes transmissions to and from the second side of the opaque parts through the second reference surface.

5. The system of claim 4 in which the first interferometer also has a test path that includes transmissions to and from the second reference surface through the first reference surface.

6. The system of claim 1 in which the first interferometer is a frequency-shifting interferometer operating at a succession of different measuring beam frequencies for resolving wavelength-based measurement ambiguities.

7. The system of claim 6 in which the frequency-shifting interferometer provides a measurement range large enough to determine the unambiguous distances between the points on the first and second reference surfaces.

8. The system of claim 7 in which both the first and second interferometers are frequency-shifting interferometers for measuring the unambiguous distances between the points on the first side of the opaque parts and the first reference surface and between the points on the second side of the opaque parts and the second reference surface.

9. The system of claim 1 in which the points on the first and second reference surfaces that correspond to points on the first and second sides of the opaque parts differ from the points on the first and second reference surfaces that correspond to each other for measuring the unambiguous distances between the points on the first and second reference surfaces.

10. The system of claim 9 in which the first and second reference surfaces have assumed forms, and the measurement of the unambiguous distances between the corresponding points on the first and second reference surfaces together with the assumed forms allows for the calculation of unambiguous distance measurements at other corresponding points between the reference surfaces that coincide with the points on the reference surfaces that correspond to the points on the first and second sides of the opaque parts.

11. The system of claim 10 in which the processor provides for measuring part thickness between corresponding points on the first and second sides of the opaque parts by subtracting the respective measures of the unambiguous distances between the corresponding points on the first and second sides of the opaque parts and the first and second reference surfaces from the unambiguous distances between the coinciding points on the first and second reference surfaces derived from the measures of the unambiguous distances between other corresponding points on the first and second reference surfaces.

12. An interferometric system for measuring test parts having first and second side surfaces, comprising:
   a first interferometer having a first reference surface and a first optical pathway conveying a first measuring beam for measuring optical path length differences between the first side surface of the test parts and the first reference surface;
   a second interferometer having a second reference surface and a second optical pathway conveying a second measuring beam for measuring optical path length differences between the second side surface of the test parts and the second reference surface;
   the first optical pathway of the first interferometer extending beyond the first side surface of the test parts to the second reference surface of the second interferometer for measuring optical path length differences between the first and second reference surfaces; and
   a processor that combines the measures of the respective optical path length differences between the first and second side surfaces of the test parts and the first and second reference surfaces with the measures of the optical path length differences between the first and second reference surfaces for measuring unambiguous distances between the first and second side surfaces of the test parts.

13. The system of claim 12 in which the first optical pathway overlaps the second optical pathway in length between the second side surface of the test parts and the second reference surface.

14. The system of claim 12 in which the first reference surface divides the first measuring beam into a first reference beam that reflects from the first reference surface and a first test beam that transmits through the first reference surface.

15. The system of claim 14 in which the first test beam includes a primary transverse area that reflects from the first side surface of the test parts and a secondary transverse area that reflects from the second reference surface.

16. The system of claim 15 in which the primary and secondary transverse area of the first test beam encounter both the first side surface of the test parts and the second reference surface at near normal incidence.

17. The system of claim 12 in which the processor provides for deriving (a) a first measure of parallelism between the first side surface of the test parts and the first reference surface, (b) a second measure of parallelism between the second side surface of the test parts and the second reference surface, and (c) a third measure of parallelism between the two reference surfaces and combines the three measures of parallelism to calculate a fourth measure of parallelism between the first and second side surfaces of the test parts.

18. The system of claim 12 further comprising a mount for the test parts and in which the first and second reference surfaces straddle the mount along the first optical pathway.

19. The system of claim 18 in which the first and second reference surfaces extend substantially parallel to each other.

20. The system of claim 13 in which the second optical pathway of the second interferometer extends beyond the second side surface of the test parts to the first reference surface of the first interferometer for measuring optical path length differences between the first and second reference surfaces.

21. The system of claim 20 in which the second optical pathway overlaps the first optical pathway in length between the first side surface of the test parts and the first reference surface.

22. The system of claim 21 in which the processor provides for comparing the measure of optical path length differences between the first and second reference surfaces by the first interferometer with the measure of optical path length differences between the first and second reference surfaces by the second interferometer for measuring differences between the first and second interferometers.

23. An interferometric system for measuring the opposite sides of a test part both individually and relative to each other, comprising:
   first and second interferometers arranged for measuring the opposite sides of the test part;
   the interferometers having at least one light source for producing first and second measuring beams and an imaging subsystem for imaging the opposite sides of the test part with the first and second measuring beams;
   the first interferometer having a first reference surface that divides the first measuring beam into a first reference beam and a first test beam for measuring optical path length differences between the first reference surface and a first of the opposite sides of the test part and between the first reference surface and the second reference surface of the second interferometer;
   the second interferometer having a second reference surface that divides the second measuring beam into a second reference beam and a second test beam for measuring optical path length differences between the second reference surface and a second of the opposite sides of the test part;
   the first test beam having a primary transverse area that reflects from the first side of the test part and a secondary transverse area that reflects from the second reference surface of the second interferometer;
   the second test beam having a transverse area that reflects from the second side of the test part; and
   the imaging subsystem arranged for imaging interference patterns formed between (a) the first reference surface and the first side of the test part by the first measuring beam for measuring unambiguous distances between the first reference surface and the first side of the test part, (b) the second reference surface and the second side of the test part by the second measuring beam for measuring unambiguous distances between the second reference surface and the second side of the test part, and (c) the first reference surface and the second reference surface by the first measuring beam for for measuring unambiguous distances between the first and second reference surfaces; and
   a processor that calculates unambiguous distances between the first and second sides of the test part based on the unambiguous distances of the first and second sides of the test part with respect to the first and second reference surfaces and the unambiguous distance between the first and second reference surfaces.

24. The system of claim 23 in which the imaging subsystem includes:
   a first camera that simultaneously records images of the interference patterns formed between the first reference surface and the first side of the test part and between the first reference surface and the second reference surface, and a second camera that records an image of the interference pattern formed between the second reference surface and the second side of the test part.

25. The system of claim 24 further comprising:
a first beamsplitter that directs the first measuring beam toward the first reference surface, the first side of the test part, and the second reference surface and redirects the first measuring beam from the first reference surface, the first side of the test part, and the second reference surface to the first camera, and
a second beamsplitter that directs the second measuring beam toward the second reference surface and the second side of the test part and redirects the second measuring beam from the second reference surface and the second side of the test part to the second camera.

26. The system of claim 25 in which the first and second beamsplitters are polarizing beamsplitters and further comprising:
a first polarization modifying element located between the first beamsplitter and the first reference surface for redirecting the reflected first measuring beam to the first camera, and
a second polarization modifying element located between the second beamsplitter and the second reference surface for redirecting the reflected second measuring beam to the second camera.

27. The system of claim 26 in which the first and second polarization modifying elements provide for oppositedirection polarization rotation for isolating the first measuring beam from the second camera and for isolating the second measuring beam from the first camera.

28. The system of claim 23 further comprising:
a beamsplitter that divides the light source into the first and second measuring beams and redirects the reflected first and second measuring beams to the imaging subsystem.

29. The system of claim 28 in which the beamsplitter is a polarizing beamsplitter and further comprising:
a first polarization modifying element located between the beamsplitter and the first reference surface for redirecting the reflected first measuring beam to the imaging subsystem, and
a second polarization modifying element located between the beamsplitter and the second reference surface for redirecting the reflected second measuring beam to the imaging subsystem.

30. The system of claim 29 in which the polarization modifying elements provide for cumulative polarization rotation for directing reflected portions of the first and second measuring beams to the imaging subsystem and for preventing transmitted portions of the first and second measuring beams that transmit through both reference surfaces from reaching the imaging subsystem.

31. The system of claim 29 in which the beamsplitter is a first beam splitter and further comprising:
a first camera that simultaneously records images of the interference patterns formed between the first reference surface and the first side of the test part and between the first reference surface and the second reference surface,
a second camera that records an image of the interference pattern formed between the second reference surface and the second side of the test part, and
a second beamsplitter that directs the reflected first measuring beam to the first camera and directs the reflected second measuring beam to the second camera.

32. The system of claim 23 in which the transverse area of the second test beam is a primary transverse area, and the second test beam also includes a secondary transverse area that reflects from the second reference surface.

33. The system of claim 32 in which the imaging subsystem is arranged for imaging interference patterns formed between the first reference surface and the second reference surface by the second measuring beam.

* * * * *